(12) United States Patent
Chang et al.

(10) Patent No.: US 11,770,497 B2
(45) Date of Patent: Sep. 26, 2023

(54) METHOD AND DEVICE FOR PROCESSING VIDEO, AND STORAGE MEDIUM

(71) Applicant: BEIJING XIAOMI PINECONE ELECTRONICS CO., LTD., Beijing (CN)

(72) Inventors: Binglin Chang, Beijing (CN); Kailun Ma, Beijing (CN); Zhenghui Shi, Beijing (CN); Qingmin Wang, Beijing (CN)

(73) Assignee: Beijing Xiaomi Pinecone Electronics Co., Ltd., Beijing (CN)

( * ) Notice: Subject to any disclaimer, the term of this patent is extended or adjusted under 35 U.S.C. 154(b) by 205 days.

(21) Appl. No.: 17/244,919

(22) Filed: Apr. 29, 2021

(65) Prior Publication Data
US 2022/0038642 A1  Feb. 3, 2022

(30) Foreign Application Priority Data
Jul. 28, 2020 (CN) .......................... 202010737025.5

(51) Int. Cl.
*H04N 5/272* (2006.01)
*G06T 7/33* (2017.01)
(Continued)

(52) U.S. Cl.
CPC ............ *H04N 5/272* (2013.01); *G06T 7/337* (2017.01); *G11B 27/034* (2013.01); *G11B 27/036* (2013.01)

(58) Field of Classification Search
CPC .. H04N 5/272; H04N 5/265; H04N 21/47205; H04N 21/47217; G06T 7/337;
(Continued)

(56) References Cited

U.S. PATENT DOCUMENTS

2010/0195989 A1* 8/2010 Amano ................. H04N 19/61
386/E5.003
2012/0002112 A1  1/2012 Huang et al.
(Continued)

FOREIGN PATENT DOCUMENTS

JP    2002344946 A   11/2002
JP    2004186994 A    7/2004
(Continued)

OTHER PUBLICATIONS

Supplementary European Search Report in the European Application No. 21171253.4, dated Nov. 24, 2021, (7p).
(Continued)

*Primary Examiner* — Yogesh K Aggarwal
(74) *Attorney, Agent, or Firm* — Arch & Lake LLP

(57) ABSTRACT

A method, apparatus, and a non-transitory computer-readable storage medium for processing a video are provided. A terminal determines a subject region of a video frame in a video and a background region. A target object is located in the subject region. The background region is a region of the video frame other than the subject region. The terminal overlays the subject region in at least one of a first video frame having the target object on at least one of a second video frame having the target object and generates a special effect frame including at least two subject regions in each of which the target object is located.

18 Claims, 9 Drawing Sheets

---

S101, a subject region of a video frame in a video, in which a target object is located, and a background region, are determined. The background region is a region of the video frame other than the subject region

↓

S102, the subject region in at least one of a first video frame having the target object is overlaid on at least one of a second video frame having the target object, generating a special effect frame including at least two subject regions in each of which the target object is located

(51) Int. Cl.
   *G11B 27/034* (2006.01)
   *G11B 27/036* (2006.01)
(58) Field of Classification Search
   CPC . G06T 2207/10016; G06T 2207/20104; G06T 2207/30196; G06T 1/00; G06T 7/194; G06T 7/12; G06T 7/10; G11B 27/034; G11B 27/036; G06V 10/267; G06V 10/44; G06V 20/10; G06V 20/695
   See application file for complete search history.

(56) References Cited

U.S. PATENT DOCUMENTS

| | | | |
|---|---|---|---|
| 2017/0094192 A1 | 3/2017 | Adsumilli et al. | |
| 2017/0094193 A1 | 3/2017 | Adsumilli et al. | |
| 2017/0094194 A1* | 3/2017 | Adsumilli | G06T 7/254 |
| 2017/0094195 A1 | 3/2017 | Adsumilli et al. | |
| 2017/0094196 A1 | 3/2017 | Adsumilli et al. | |
| 2020/0228730 A1 | 7/2020 | Adsumilli et al. | |

FOREIGN PATENT DOCUMENTS

| | | |
|---|---|---|
| JP | 2008178089 A | 7/2008 |
| JP | 2013162333 A | 8/2013 |
| KR | 101316848 B1 | 10/2013 |
| WO | 2018180039 A1 | 10/2018 |

OTHER PUBLICATIONS

First Office Action of the Korean Application No. 10-2021-0054745, dated Mar. 24, 2022 with English translation, (12p).

First Office Action of the Japanese Application No. 2021-075819, dated May 2, 2022 with English translation, (10p).

\* cited by examiner

S101, a subject region of a video frame in a video, in which a target object is located, and a background region, are determined. The background region is a region of the video frame other than the subject region S102, the subject region in at least one of a first video frame having the target object is overlaid on at least one of a second video frame having the target object, generating a special effect frame including at least two subject regions in each of which the target object is located

FIG. 1

METHOD AND DEVICE FOR PROCESSING VIDEO, AND STORAGE MEDIUM

CROSS-REFERENCE TO RELATED APPLICATION

This application is based on, and claims benefit of priority to, Chinese Application No. 202010737025.5 filed on Jul. 28, 2020. Disclosure of the Chinese Application is hereby incorporated by reference in its entirety.

TECHNICAL FIELD

The present disclosure relates to multimedia technology. More specifically, this application relates to video processing.

BACKGROUND

With the continuous development of multimedia technology, video special effects are often used in film and television works to display rich and colorful and even surrealistic video effects such as a time static special effect, a doppelgänger (or clone, or copy) special effect, etc. However, implementation of a special effect of a video requires professional post-processing, and massive amount of edition and production using post-production tools, which makes it difficult to promote and apply the special effect technology. In this way, it is also difficult to preview the special effect directly in the video photographing process. In addition, the production of the video special effect is difficult, the learning cost is high, and therefore, a high professional requirement is also required for the post-production personnel.

SUMMARY

The present disclosure may relate to multimedia technologies. The present disclosure provides a method and device for processing a video, and a storage medium.

According to a first aspect of the present disclosure, there is provided a method for processing a video. The method may include a terminal determining a subject region of a video frame in a video and a background region. A target object may be located in the subject region. The background region may be a region of the video frame other than the subject region. The terminal may further overlay the subject region in at least one of a first video frame having the target object on at least one of a second video frame having the target object and generate a special effect frame including at least two subject regions in each of which the target object is located.

According to second aspect of the present disclosure, a device is provided. The device may include one or more processors and a non-transitory computer-readable storage medium for storing executable instructions executable on the one or more processors. The one or more processors may be configured to determine a subject region of a video frame in a video and a background region. A target object may be located in the subject region. The background region may be a region of the video frame other than the subject region. The one or more processors may be further configured to overlay the subject region in at least one of a first video frame having the target object on at least one of a second video frame having the target object. The one or more processors may be further configured to generate a special effect frame including at least two subject regions in each of which the target object is located.

According to a third aspect of the present disclosure, a non-transitory computer-readable storage medium having stored therein instructions is provided. When the instructions are executed by one or more processors of the apparatus, the instructions may cause the apparatus to determine a subject region of a video frame in a video and a background region. A target object may be located in the subject region. The background region may be a region of the video frame other than the subject region. The instructions may also cause the apparatus to overlay the subject region in at least one of a first video frame having the target object on at least one of a second video frame having the target object. The instructions may also cause the apparatus to generate a special effect frame including at least two subject regions in each of which the target object is located.

It should be understood that the general description above and the elaboration below are illustrative and explanatory only, and do not limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 1 is a flowchart illustrating a method for processing a video, according to an example of the present disclosure.

DETAILED DESCRIPTION

Figure 2:
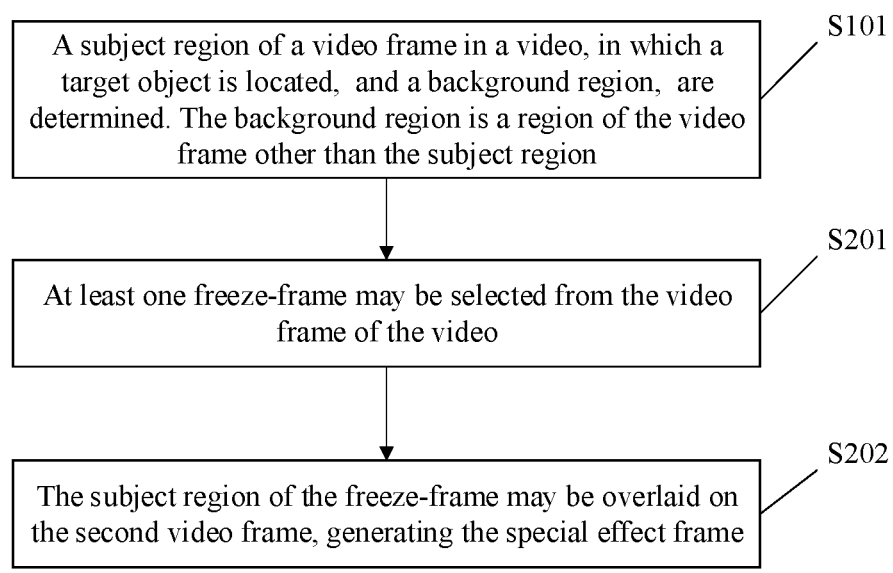
FIG. 2 is a flowchart illustrating a method for processing a video, according to an example of the present disclosure.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the present disclosure. Instead, they are merely examples of devices and methods consistent with aspects related to the present disclosure as recited in the appended claims. The illustrative implementation modes may take on multiple forms, and should not be taken as being limited to examples illustrated herein. Instead, by providing such implementation modes, embodiments herein may become more comprehensive and complete, and comprehensive concept of the illustrative implementation modes may be delivered to those skilled in the art. Implementations set forth in the following illustrative embodiments do not represent all implementations in accordance with the subject disclosure. Rather, they are merely examples of the apparatus and method in accordance with certain aspects herein as recited in the accompanying claims.

Note that although a term such as first, second, third may be adopted in an embodiment herein to describe various kinds of information, such information should not be limited to such a term. Such a term is merely for distinguishing information of the same type. For example, without departing from the scope of the embodiments herein, the first information may also be referred to as the second information. Similarly, the second information may also be referred to as the first information. Depending on the context, a "if" as used herein may be interpreted as "when" or "while" or "in response to determining that".

In addition, described characteristics, structures or features may be combined in one or more implementation modes in any proper manner. In the following descriptions, many details are provided to allow a full understanding of embodiments herein. However, those skilled in the art will know that the embodiments herein may be carried out without one or more of the details; alternatively, another method, component, device, option, etc., may be adopted. Under other conditions, no detail of a known structure, method, device, implementation, material or operation may be shown or described to avoid obscuring aspects of embodiments herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

A terminal may sometimes be referred to as a smart terminal. The terminal may be a mobile terminal. The terminal may also be referred to as User Equipment (UE), a Mobile Station (MS), etc. A terminal may be equipment or a chip provided therein that provides a user with a voice and/or data connection, such as handheld equipment, onboard equipment, etc., with a wireless connection function. Examples of a terminal may include a mobile phone, a tablet computer, a notebook computer, a palm computer, a Mobile Internet Device (MID), wearable equipment, Virtual Reality (VR) equipment, Augmented Reality (AR) equipment, a wireless terminal in industrial control, a wireless terminal in unmanned drive, a wireless terminal in remote surgery, a wireless terminal in a smart grid, a wireless terminal in transportation safety, a wireless terminal in smart city, a wireless terminal in smart home, etc.

FIG. 1 is a flowchart of a method for processing a video according to an illustrative embodiment. As shown in FIG. 1, the method is applied to a terminal, and includes steps as follows.

In S101, a subject region of a video frame in a video, in which a target object is located, and a background region, are determined. The background region is a region of the video frame other than the subject region.

In S102, the subject region in at least one of a first video frame having the target object is overlaid on at least one of a second video frame having the target object, generating a special effect frame including at least two subject regions in each of which the target object is located.

In embodiments of the present disclosure, the terminal is electronic equipment having a display function. A user may play a video or preview video content during recording of the video through the terminal.

The video to be processed may be a recorded video file or a video being recorded. The process of video recording includes a process of acquiring a plurality of consecutive video frames. A recorded video part is formed of the video frames.

In embodiments of the present disclosure, the target object may be identified in a video frame in a target identification manner. The target object may be the subject part of focus in a picture, including a subject that may move in the video, such as a movable object such as a person, an animal, an automobile, an airplane, etc., in the picture.

By picture segmentation, the subject region in which the target object is located may be isolated from the image of a video frame. By overlaying the subject region in which the target object is located on another video frame, a doppelgänger effect of displaying at least two subject regions in a video picture may be implemented.

The first video frame serves as a video frame providing a segment subject region of the target object, and the second video frame serves as a video frame on which the segment subject region overlays. While providing a segment subject region, a first video frame may also serve as a second video frame on which the subject region of another first video frame overlays. For example, the subject region in the first frame is isolated and overlaid on the second frame and each following video frame, and the subject region in the 100th frame is isolated and overlaid on the 101st frame and each following video frame. Then, the second frame and each following video frame each serve as a second video frame, and the 100th frame serves both as a first video frame and a second video frame.

For example, in the video, the subject person walks from the left end of the picture to the right end of the picture. In video processing, a picture in which the subject person is located at the left end is segmented to acquire the subject region. The segment subject region acquired from the segmentation is then overlaid on each of video frames in the video where the subject person walks from left to right. In this way, while displaying that the subject person is walking toward the right end, the subject person frozen at the left end is displayed simultaneously, thereby implementing the frozen doppelgänger special effect.

In embodiments of the present disclosure, the subject region in which the target object is located may be an image region within the edge of the target object. For example, the target object is cut out of a video frame along the edge by image segmentation technique, and the region enclosed by the edge of the target object is taken as the subject region.

In an embodiment, the subject region in which the target object is located may also be a graphic region of a fixed shape including the target object, such as a rectangular region or a circular region, etc. If the background picture of the video is a static environment, in which case the region of each of a plurality of video frames other than the target object is a fixed picture, then, the subject region in which the target object is located may be isolated by a simple rule graph.

In another embodiment, during recording of the video, after the special effect frame has been generated, the special effect frame may be cached in predetermined cache space. After the video recording completes, a prompt of whether to generate a special effect video is displayed. It is determined whether to generate a special effect video according to the operation instruction of the user. If the user determines to generate a special effect video, the cached special effect frame replaces an original video frame to generate and save as a special effect video. If the user determines not to generate any special effect video, the cached special effect frame may be deleted.

It should be noted that after a special effect video has been generated, the selection of whether to save the original video may be provided as needed by the user. If the user chooses not to save the original video, the original video frame corresponding to the generated special effect frame may be deleted and replaced with the special effect frame. The video frame stream composed of video frames after replacement with the special effect frame is then used to generate the special effect video. If the user chooses to retain the original video, both the special effect video after replacement with the special effect frame, and the original video composed of original video frames, may be generated, respectively. This facilitates subsequent comparison, viewing, and further adjustment by the user.

According to one or more embodiments of the present disclosure, a target object in different video frames in a video is automatically identified and isolated via image segmentation technology of the terminal per se, and overlaid on another video frame, thereby generating a video special effect of doppelgängers or copies of the target object easily and quickly, without having to use any complex post-production tool or production technique. In this way, in playback or preview during photographing, a special effect frame may be displayed directly in a picture, displaying a special effect, thereby facilitating video production at a terminal, while improving a viewing experience of a user.

In some embodiments, the subject region of the video frame in the video in which the target object is located and the background region other than the subject region may be determined as follows.

The target object in the video frame in the video may be identified.

The subject region and the background region may be determined according to the target object.

In embodiments of the present disclosure, a target object in a video frame is identified using an image identification technique. For example, different objects in an image are identified using an edge identification technique. An object in an image having a characteristic of a person is identified using portrait identification, etc. Of course, a target object to be identified may also be determined according to the operation of the user. For example, the edges of different objects in an image are determined using an edge identification technique, and then the subject region of the target object is determined through the image region clicked on by the user. As another example, an edge graph plotted by a user by an operation such as touch, is received, and a region enclosed by the edge graph is determined as a subject region of the target object.

After determining the subject region in which the target object is located, a region beyond the edge of the subject region may be determined as the background region. In this way, the target object in an image may be identified in a simple manner, and a video image may be divided into the subject region and the background region according to the target object.

In some embodiments, the first video frame includes a freeze-frame, and the second video frame includes a video frame after the freeze-frame. As shown in FIG. 2, in S102, the subject region in the at least one of the first video frame having the target object may be overlaid on the at least one of the second video frame having the target object, generating the special effect frame including the at least two subject regions in each of which the target object is located, as follows.

In S201, at least one of the freeze-frame may be selected from the video frame of the video.

In S202, the subject region of the freeze-frame may be overlaid on the second video frame, generating the special effect frame.

In embodiments of the present disclosure, video frames at different locations in the video may be selected as freeze-frames. The subject region in a freeze-frame may serve to be overlaid on another video frame that comes after the freeze-frame. In this way, the target object in the freeze-frame in the video may form a "frozen" effect, that is, the target object in the freeze-frame is always displayed in each video frame after the freeze-frame.

It will be appreciated that if there are a plurality of freeze-frames in a video, as the video is played, after the freeze-frames have appeared one by one, frozen doppelgängers (or clones, or copies) will appear one by one in the video picture. For example, the target object is a running person. While the person is running, a freeze-frame appears once in a while, then a plurality of "doppelgängers", or duplicates, of the person fixed at different locations will appear one after another in the video picture, thereby implementing a "frozen doppelgänger" specific effect.

The process of identifying the target object, selecting a freeze-frame, and generating a special effect frame may be performed in the process of processing the video file after the video recording completes, or may be performed at any time in the process of acquiring the video frames during video recording, and the special effect frame with the overlaid subject region may be displayed directly on a preview interface.

In addition, in the process of recording the video, a photographing parameter may be fixed, reducing special effect frame distortion caused by automatic adjustment of the photographing parameter due to a change in light. A photographing parameter includes, but is not limited to, parameters such as International Organization for Standardization (ISO) photosensibility, exposure time, a focus distance, white balance, etc.

In this way, by selecting freeze-frames at different intervals, it is possible to produce diversified doppelgänger effects, thereby adding fun to the entire video. Meanwhile, the production process is simple and easy to operate, and direct production during video recording may add fun to video photographing and improves experience of human-terminal interaction, and complicated post-production is not required.

In some embodiments, the at least one of the freeze-frame may be selected from the video frame of the video as follows.

A predetermined operation instruction may be detected during playback of the video.

A video frame displayed when the predetermined operation instruction is detected may be determined as the freeze-frame.

There may be multiple modes for selecting a freeze-frame. A freeze-frame may be selected in different modes according to different video features or user preferences. In the embodiment, a freeze-frame may be selected according to a user operation received.

In embodiments of the present disclosure, the process of video playback may be a process of playback of an existing video file, or may be preview playback during recording. In the case of a process of playback of an existing video file, playback may also be performed at different playback speeds as needed by the user. For example, in order to facilitate clear display of the video to allow a user to perform a selection operation, slow playback may be performed, such as at 0.5 times the speed, at 0.1 times the speed, or even in a frame-by-frame switch mode. In the case of preview playback during recording, the user may select a freeze-frame flexibly according to the interaction between the user and the photographed object or the actual action of the photographed object in the photographing process.

It will be appreciated that the terminal may determine a freeze-frame according to a predetermined operation instruction, and when it is detected that the operation instruction of the user is the predetermined operation instruction, the terminal may determine that the currently displayed video frame is to be used as a freeze-frame. Here, the predetermined operation instruction may be a touch instruction of a predetermined gesture, such as an instruction of a touch operation such as clicking, double-clicking, sliding upward, sliding downward, or irregular sliding. The predetermined operation instruction may also be a case operation instruction, such as pressing a volume key and an on/off key at the same time, etc. The predetermined operation instruction may also be a voice input instruction, etc.

In this way, regardless of whether the terminal is recording a video or playing an existing video file, a user may select a freeze-frame through a simple operation and complete the production of a "frozen doppelgänger" special effect, with a simple convenient operation.

In some embodiments, the at least one of the freeze-frame may be selected from the video frame of the video as follows.

Video frames at intervals of a predetermined duration in the video may be selected as the freeze-frame.

In the embodiment, the terminal may automatically select a freeze-frame according to an interval of a predetermined duration, such as an interval of a predetermined duration of 10 seconds. Then, the terminal may use a video frame being played as a freeze-frame every 10 seconds during video recording or video file playback.

Of course, the mode may also be performed other than during playback or preview. Since video frames of the video are played at a fixed frequency, it is possible to determine the number of video frames in between video frames at intervals of a predetermined duration without playback. That is, each freeze-frame in a video file may be determined directly according to the interval of the number of video frames. For example, if the video is played at a frequency of 30 frames per second, and the predetermined duration is 10 seconds, then frames spaced at every 300 frames in the video may be determined as freeze-frames.

In this way, freeze-frame selection may be completed automatically by the terminal by simple setting, without having to watching the video repeatedly to perform selection, and without requiring any accurate user operation.

In some embodiments, the at least one of the freeze-frame may be selected from the video frame of the video as follows.

A stance of the target object in the video frame of the video may be determined.

When stances of the target object in a consecutive number N of the video frame are identical, one of the consecutive number N of the video frame may be selected as the freeze-frame. The N may be a positive integer greater than or equal to 2.

In embodiments of the present disclosure, automatic selection may also be performed through the content of the video. A selected freeze-frame is determined by detecting the stance of the target object in a video frame. For different types of videos, personalized automatic selection may be implemented.

In photographing a frozen doppelgänger video special effect, the photographed object and the user themselves may pose and photograph an action as the frozen doppelgänger. That is, while moving, the photographed object may pose in a specific stance when it is desired to produce a frozen doppelgänger effect, and pause for a period of time before continuing to move.

In this way, the terminal may select a freeze-frame according to whether the target object remains the same stance in the photographed picture in N consecutive video frames.

It will be appreciated that since the photographed object may not be able to maintain the identical stance in the N video frames in which the movement is paused, the "same stance" here may be understood as not generating a movement beyond a predetermined range, and is not limited to a slight shaking of the target object or a small movement of a body part such as a blink, a finger wobble, etc.

In this way, a freeze-frame is selected by identifying the stance of the target object, so that it is not necessary for the user to make a manual selection, and it is possible to implement automatic personalized selection of video content, improving the flexibility and the degree of automation in the video production process, providing better human-terminal interaction experience.

In some embodiments, the at least one of the freeze-frame may be selected from the video frame of the video as follows.

A location of the target object in a current video frame may be determined.

When a distance between the location of the target object in the current video frame and a location of the target object in a last freeze-frame is a predetermined distance, the current video frame may be determined as the freeze-frame.

Similar to the previous embodiment, in the embodiment, selection of a freeze-frame is also performed according to a video picture, and video frames in which the target object is at locations spaced apart by a fixed distance are selected as freeze-frames according to the location of the target object in each video frame. For example, whenever the target object is at a predetermined distance from its location in the last freeze-frame, the current video frame is selected as a freeze-frame, so that a plurality of freeze-frames may be distributed evenly in a video picture.

It should be noted that in the embodiments of the present disclosure, in an actual application, one of the several modes for selecting a freeze-frame may always be used, or the mode may be switched at any time according to a user setting. Further, a selection from the several modes is possible in producing the same video. In this way, more diversified operations may be implemented, and a combination of automatic and manual operations may be implemented, facilitating the production of more abundant special effects.

In an embodiment, prompt information is displayed before video recording starts. The prompt information serves to prompt the user whether to enable the function of automatic freeze-frame selection. If the received user instruction determines to enable the function of automatic freeze-frame selection, automatic selection is performed in accordance with at least one of the above modes during the recording process. At least one of the above modes includes automatically selecting a freeze-frame according to a location or a stance of the target object, or an interval of a predetermined duration in the video.

In another embodiment, before video recording starts, it may be determined, according to a user instruction, whether to enable the function of producing a special effect frame during recording. If the function of producing a special effect frame is activated, the prompt information is displayed.

In this way, the user may select whether to activate automatic selection of a freeze-frame and the mode for the automatic selection according to the actual requirement, the type and content of the video to be shot. Of course, the user may also determine whether to select a freeze-frame by manual selection before video recording starts. A manual selection mode may also be used as a default mode, and by default a freeze-frame is determined in a manual selection mode as long as the function of special effect frame production during recording is activated.

In some embodiments, the method further includes a step as follows.

An alignment parameter of the subject region of the first video frame may be determined according to a location of the target object in the first video frame. The alignment parameter may be used to determine a target location of the subject region of the first video frame in the special effect frame.

The subject region in at least one video frame may be overlaid on at least one video frame other than the video frame where the target object is located, generating the special effect frame including at least two subject regions where the target object is located, as follows.

The subject region may be overlaid, according to the alignment parameter, at the target location on at least one video frame other than the video frame in which the target object is located, generating the special effect frame including two subject regions in each of which the target object is located.

In embodiments of the present disclosure, after determining a freeze-frame, the subject region of the freeze-frame in which the target object is located may be overlaid on each video frame after the freeze-frame, thereby implementing the "frozen" effect. A background region does not need to be covered. Thus, other than the region in which the "frozen doppelgänger" is located, other regions still change with playback of the video, thereby producing an unreal feeling visually beyond a physical law, bringing about visual impact of a special effect.

It may be appreciated that in the process of overlaying a subject region and generating the special effect frame, it is necessary to overlay the subject region at a designated location of the special effect frame in order to implement the effect of the frozen subject regions in the continuous video. Therefore, an alignment parameter of the subject region is determined here according to the location of the target object in the original video frame, that is, the freeze-frame. In the subsequent process of generating the special effect frame, the location where the subject region is overlaid may be determined according to the alignment parameter of the subject region, so that the location of the "frozen doppelgänger" on the special effect frame is consistent with the location of the target object in the freeze-frame.

In some embodiments, the alignment parameter of the subject region of the first video frame may be determined according to the location of the target object in the first video frame as follows.

A video frame may be selected as a reference frame from the video frame of the video.

The alignment parameter may be determined according to a location offset of the target object in the first video frame with respect to the target object in the reference frame.

The alignment parameter may be determined according to the reference frame of the video. For example, the first frame in the video frame, or the first freeze-frame, etc., is selected as the reference frame, and then a corresponding alignment parameter is determined based on the location offset of the target object in a subsequent freeze-frame and the reference frame with respect to the reference frame. Thus, the alignment parameter of each freeze-frame is determined according to the location with respect to the reference frame of the video, thereby maintaining continuity in locations of the target object in different video frames.

That is, according to embodiments of the present disclosure, the relative location relationship is used instead of the absolute location of the entire video picture, so that the location deviation caused by the picture jitter and the like may be reduced, thereby making the picture of the special effect frame more smooth. In this way, even if the user perform photographing by directly holding the terminal, existence of some jitters will not affect the effect of the picture of the special effect frame, and the terminal does not need to be fixed using a fixing tool such as a tripod.

Figure 3:
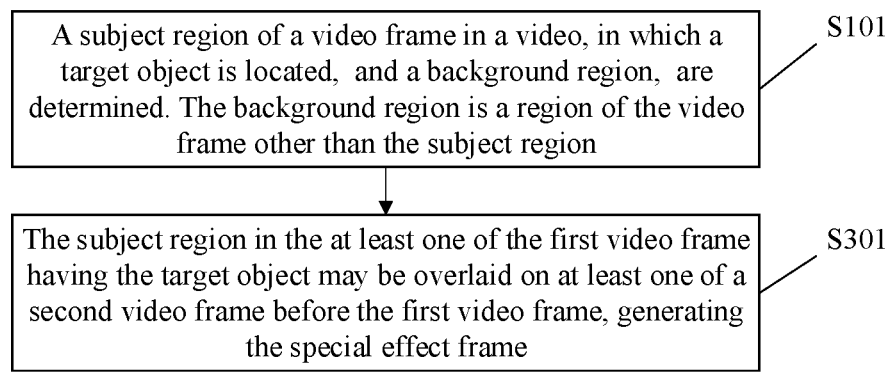
FIG. 3 is a flowchart illustrating a method for processing a video, according to an example of the present disclosure.

In some embodiments, the second video frame includes a video frame before the freeze-frame. As shown in FIG. 3, in S102, the subject region in the at least one of the first video frame having the target object may be overlaid on the at least one of the second video frame having the target object, generating the special effect frame including the at least two subject regions in each of which the target object is located as follows.

In S301, the subject region in the at least one of the first video frame having the target object may be overlaid on at least one of a second video frame before the first video frame, generating the special effect frame.

In the embodiment, it is possible to display a specific effect of increasing "frozen doppelgängers" during video recording, or during playback of a video file that has been recorded.

In embodiments of the present disclosure, a post special effect adjustment may also be performed on a video file that has been recorded, to implement the specific effect of decreasing "frozen doppelgängers".

Since a plurality of freeze-frames have been determined using the method in the embodiments during the initial production or recording of the video, the subject region of a freeze-frame overlaid may be adjusted in video frames at different locations during a subsequent playback. For example, the subject region of a freeze-frame is overlaid on a video frame before the freeze-frame, and not on a video frame after the freeze-frame.

In this way, a plurality of fixed target objects are displayed at the beginning of the video picture, and then, the number of "frozen doppelgängers" decrease with movement of the target object. That is, each time the target object moves to the location of a frozen doppelgänger, the frozen doppelgänger disappears and continues to move with the target object.

In this way, different special effects may be produced using the terminal, so that the video is more fun, and more abundant video works may be produced.

Embodiments of the present disclosure also provide an example as follows.

A frozen doppelgänger special effect is produced by editing a video, such that a plurality of frozen images of the same person appear in the video picture at the same time, and freeze-frames may be increased or decreased as the location of the person changes.

In embodiments of the present disclosure, identification of a subject region of a target object in a video picture is implemented using an artificial intelligence technology, including video picture target identification, image segmentation technology, etc. In addition, the location of the subject region, time of overlaying, etc., may be computed automatically through an alignment technology. In this way, a video result may be previewed in real time during the photographing process, and the video with a special effect picture may be quickly generated. A film may be acquired directly using a user terminal such as a mobile phone without using a post-stage video editing tool by a professional, and the production cost is low, the production time is short, and the application range is wide.

In addition, in embodiments of the present disclosure, the alignment parameter of the subject region is determined using the location with respect to the reference frame, reducing the location deviation caused by the jitter in the photographing process, therefore implementing hand-held photographing without having to use a fixing tool such as a tripod.

Figure 4:
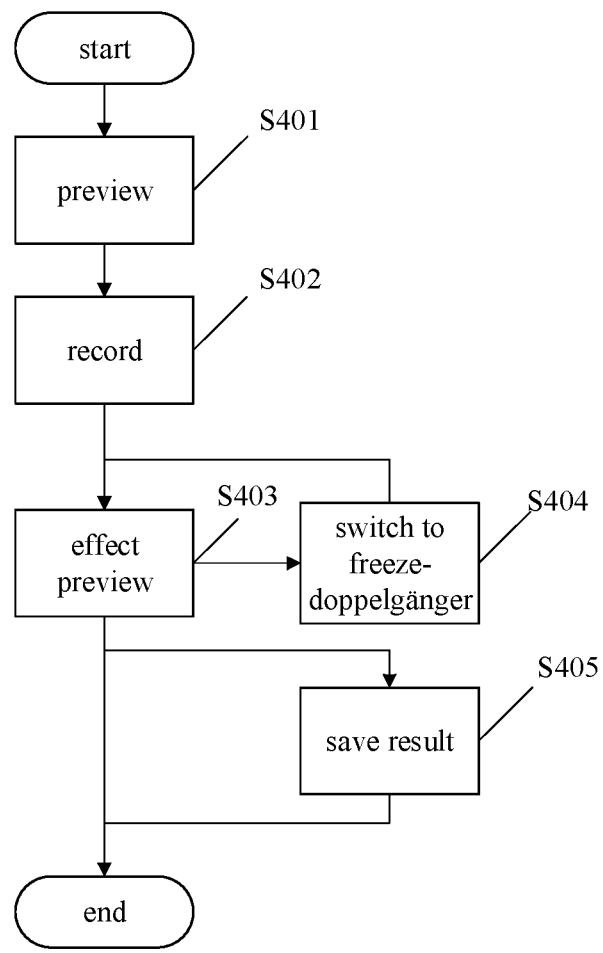
FIG. 4 is a flowchart illustrating recording a video with a frozen doppelgänger special effect, according to an example of the present disclosure.

In embodiments of the present disclosure, a flow of recording a video with a frozen doppelgänger special effect using a terminal is as shown in FIG. 4, and includes steps as follows.

In S401, a preview screen may be displayed on a preview interface after a camera function is turned on.

In S402, a recording state may be entered according to an instruction received, to start recording a video picture.

In S403, a recorded video picture and a generated special effect frame may be displayed on the preview interface, implementing effect preview.

In S404, switch to a frozen doppelgänger mode may be performed according to a switch instruction received to preview and display a special effect frame in the frozen doppelgänger mode. An original video frame may be previewed and displayed in a non-frozen doppelgänger mode.

In S405, the video frame and the special effect frame are saved, acquiring a video file.

Figure 5:
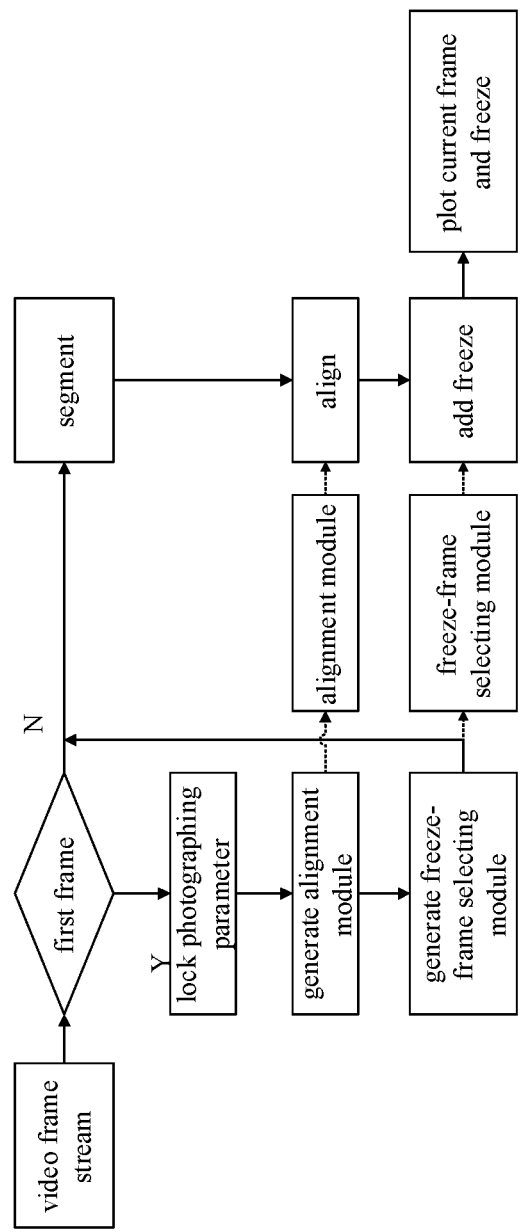
FIG. 5 is a flowchart illustrating recording a video with a frozen doppelgänger special effect, according to an example of the present disclosure.

The process of producing a special effect frame may be implemented by a flowchart as shown in FIG. 5. If a video frame being processed is the first frame, a photographing parameter of the first frame may be locked. The photographing parameter includes, but is not limited to, parameters such as ISO, exposure time, a focus distance, white balance, etc. Meanwhile, a freeze frame selecting module is initialized, providing a selection method, storage space, etc., for selecting a freeze-frame. In addition, the first frame may be determined as a reference frame, and an alignment module for subsequently determining the location of the target object may be generated according to the reference frame.

If the video being processed is any frame after the first frame, such as the i-th frame, the subject region mask i in which the target object of the frame is located is acquired using an image segmentation technique. The alignment parameter Wi of the target object in the frame is determined using the alignment module.

The sequence number i of the current frame and the subject region mask i are added to the freeze-frame selecting module, and the freeze-frame selecting module determines whether to add the current frame or a previous frame as a new freeze-frame according to a preset selection rule. The selection rule may include the following.

First, a selection is made according to time. For example, a current frame is automatically added as a freeze-frame every second.

Secondly, selection is made according to a user operation received. For example, when a touch screen receives a user click operation, a video frame at the time of the click is selected as a freeze-frame.

Thirdly, a freeze-frame is selected automatically according to the location of the target object in a video frame. For example, each time the target object is at a predetermined distance from the location in the last freeze-frame, the current video frame is selected as a freeze-frame, so that a plurality of freeze-frames may be distributed uniformly in the video picture.

Fourthly, a freeze-frame is selected automatically according to the location and time of the target object in the video. For example, when the target object stays at one location in N consecutive video frames, one of the N video frames is selected as a freeze-frame, so that automatic freeze may be implemented as willed by the person being photographed.

After selecting a freeze-frame, the subject region mask of the target object may be plotted in a video frame after each freeze-frame using the alignment parameter of the target object in the each freeze-frame, thereby generating a special effect frame with a plurality of frozen doppelgängers.

Figure 6A:
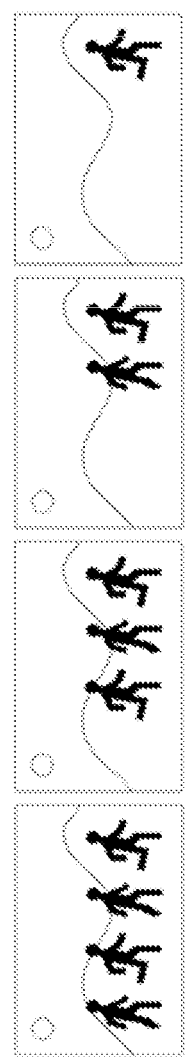
FIG. 6A is a schematic diagram illustrating a frozen doppelgänger special effect, according to an example of the present disclosure.
Figure 6B:
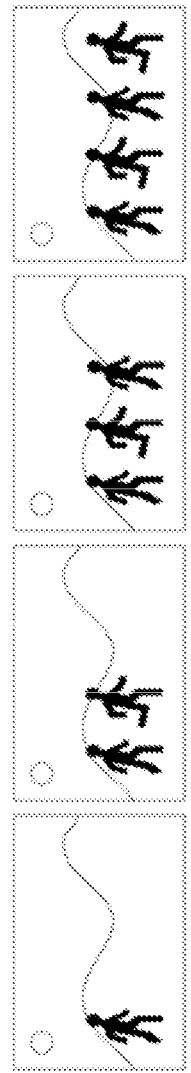
FIG. 6B is a schematic diagram illustrating a frozen doppelgänger special effect, according to an example of the present disclosure.

In embodiments of the present disclosure, the video may be processed after recording completes, generating a special effect, including different effects of increasing frozen doppelgängers and decreasing frozen doppelgängers. The effect of decreasing frozen doppelgängers is as shown in FIG. 6A, where the subject region in a freeze-frame in which the target object is located is overlaid in each video frame before the freeze-frame, implementing the effect of decreasing frozen doppelgängers in the process of playback. The effect of increasing frozen doppelgängers is as shown in FIG. 6B, where the subject region in a freeze-frame in which the target object is located is overlaid in each video frame after the frozen freeze-frame, implementing the effect of gradually increasing frozen doppelgängers in the process of playback.

With the one or more embodiments of the present disclosure, a complex video special effect editing algorithm is hidden in a product function of a terminal through an artificial intelligence technology. The user may preview a synthesized special effect in real time during a photographing process, and adjust a photographing process at any time according to feedback of the preview. After photographing completes, a video file with a special effect may be acquired, thereby effectively improving user experience.

Figure 7:
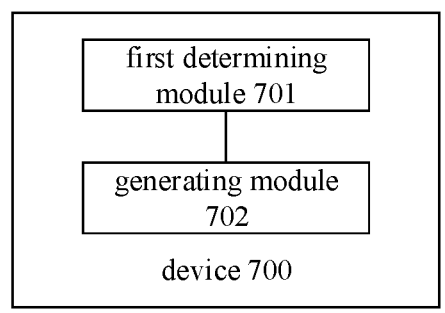
FIG. 7 is a block diagram illustrating a structure of a device for processing a video, according to an example of the present disclosure.

FIG. 7 is a block diagram of a structure of a device for processing a video according to an illustrative embodiment. As shown in FIG. 7, the device 700 is applied to a terminal, and includes modules as follows.

A first determining module 701 is configured to determine a subject region of a video frame in a video, in which a target object is located, and a background region. The background region is a region of the video frame other than the subject region.

A generating module 702 is configured to overlay the subject region in at least one of a first video frame having the target object on at least one of a second video frame having the target object, generating a special effect frame including at least two subject regions in each of which the target object is located.

In some embodiments, the first determining module includes:

an identifying sub-module configured to identify the target object in the video frame in the video; and a first determining sub-module configured to determine the subject region and the background region according to the target object.

In some embodiments, the first video frame includes a freeze-frame. The second video frame may include a video frame after the freeze-frame.

The generating module may include:

a first selecting sub-module configured to select at least one of the freeze-frame from the video frame of the video; and a generating sub-module configured to overlay the subject region of the freeze-frame on the second video frame, generating the special effect frame.

In some embodiments, the first selecting sub-module includes:

a detecting sub-module configured to detect a predetermined operation instruction during playback of the video; and a second determining sub-module configured to determine, as the freeze-frame, a video frame displayed when the predetermined operation instruction is detected.

In some embodiments, the first selecting sub-module is specifically configured to:

select, as the freeze-frame, video frames at intervals of a predetermined duration in the video.

In some embodiments, the first selecting sub-module includes:

a third determining sub-module configured to determine a stance of the target object in the video frame of the video; and a second selecting sub-module configured to, in response to stances of the target object in a consecutive number N of the video frame being identical, select one of the consecutive number N of the video frame as the freeze-frame. The N may be a positive integer greater than or equal to 2.

In some embodiments, the first selecting sub-module includes:

a fourth determining sub-module configured to determine a location of the target object in a current video frame; and a fifth determining sub-module configured to, in response to a distance between the location of the target object in the current video frame and a location of the target object in a last freeze-frame being a predetermined distance, determine the current video frame as the freeze-frame.

In some embodiments, the device further includes:

a second determining module configured to determine an alignment parameter of the subject region of the first video frame according to a location of the target object in the first video frame. The alignment parameter may be used to determine a target location of the subject region of the first video frame in the special effect frame.

The generating module may be specifically configured to:

according to the alignment parameter, overlay the subject region of the first video frame at the target location on at least one video frame other than the first video frame in which the target object is located, generating the special effect frame including two subject regions in each of which the target object is located.

In some embodiments, the second determining module includes:

a third selecting sub-module configured to select, from the video frame of the video, a video frame as a reference frame; and a sixth determining sub-module configured to determine the alignment parameter according to a location offset of the target object in the first video frame with respect to the target object in the reference frame.

In some embodiments, the second video frame includes a video frame before the freeze-frame. The generating module is specifically configured to:

overlay the subject region in the at least one of the first video frame having the target object on at least one of a second video frame before the first video frame, generating the special effect frame.

A module of the device according to an aforementioned embodiment herein may perform an operation in a mode elaborated in an aforementioned embodiment of the method herein, which will not be repeated here.

Figure 8:
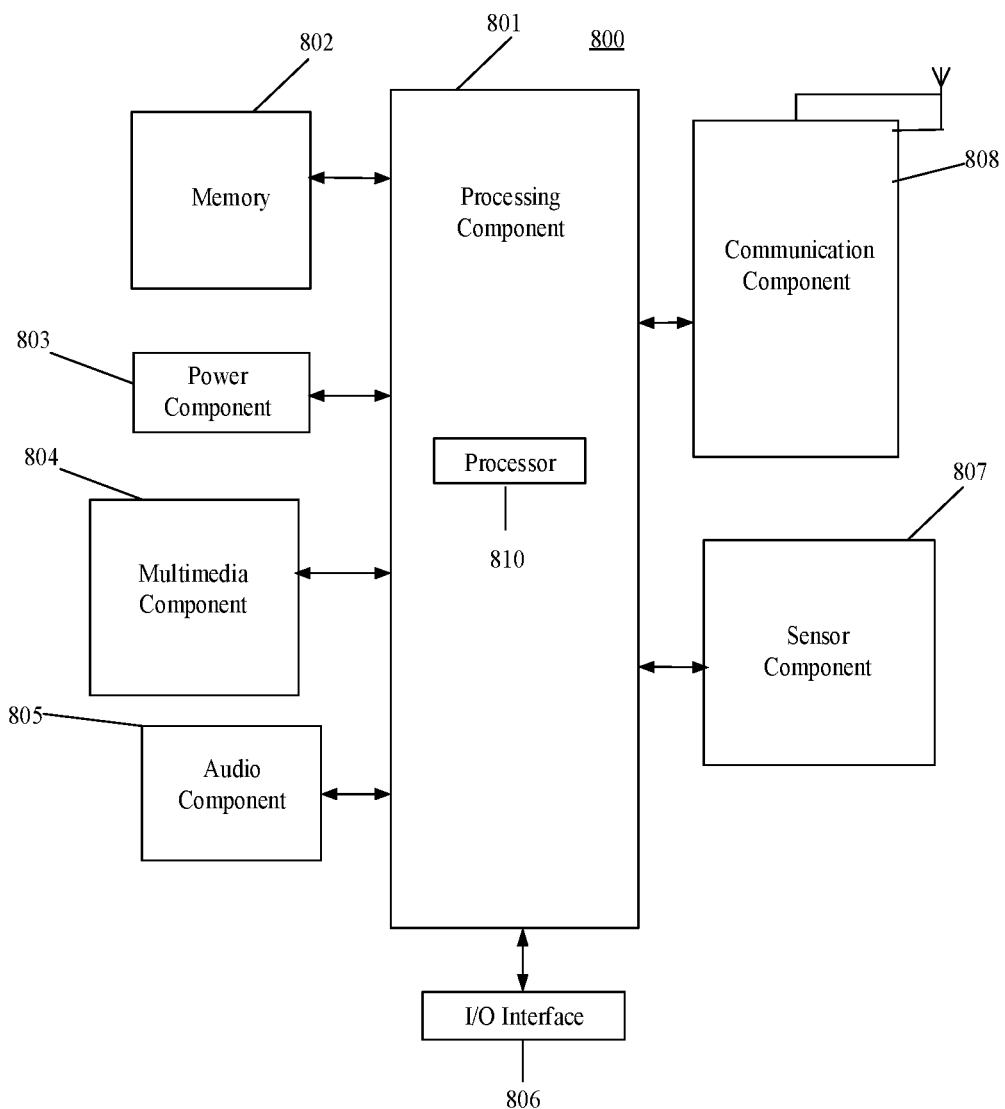
FIG. 8 is a block diagram illustrating a physical structure of a terminal, according to an example of the present disclosure.

FIG. 8 is a block diagram of a terminal 800 according to an illustrative embodiment. For example, the terminal 800 may be a terminal such as a mobile phone, a computer, a digital broadcasting terminal, messaging equipment, a game console, tablet equipment, medical equipment, fitness equipment, a Personal Digital Assistant (PDA), etc.

Referring to FIG. 8, the terminal 800 may include one or more components as follows: a processing component 801, a memory 802, a power component 803, a multimedia component 804, an audio component 805, an Input/Output (I/O) interface 806, a sensor component 807, and a communication component 808.

The processing component 801 generally controls an overall operation of the display equipment, such as operations associated with display, a telephone call, data communication, a camera operation, a recording operation, etc. The processing component 801 may include one or more processors 810 to execute instructions so as to complete all or some steps of the method. In addition, the processing component 801 may include one or more modules to facilitate interaction between the processing component 801 and other components. For example, the processing component 801 may include a multimedia module to facilitate interaction between the multimedia component 804 and the processing component 801.

The memory 802 is configured to store various types of data to support operation on the terminal 800. Examples of these data include instructions of any application or method configured to operate on the terminal 800, contact data, phonebook data, messages, pictures, videos, and/or the like. The memory 802 may be realized by any type of volatile or non-volatile storage equipment or combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk, or compact disk.

The power component 803 supplies electric power to various components of the terminal 800. The power component 803 may include a power management system, one or more power supplies, and other components related to generating, managing and distributing electric power for the terminal 800.

The multimedia component 804 includes a screen providing an output interface between the terminal 800 and a user. The screen may include a Liquid Crystal Display (LCD) and a Touch Panel (TP). If the screen includes a TP, the screen may be realized as a touch screen to receive an input signal from a user. The TP includes one or more touch sensors for sensing touch, slide and gestures on the TP. The touch sensors not only may sense the boundary of a touch or slide move, but also detect the duration and pressure related to the touch or slide move. In some embodiments, the multimedia component 804 includes a front camera and/or a rear camera. When the terminal 800 is in an operation mode such as a shooting mode or a video mode, the front camera and/or the rear camera may receive external multimedia data. Each of the front camera and/or the rear camera may be a fixed optical lens system or may have a focal length and be capable of optical zooming.

The audio component 805 is configured to output and/or input an audio signal. For example, the audio component 805 includes a microphone (MIC). When the terminal 800 is in an operation mode such as a call mode, a recording mode, and a voice recognition mode, the MIC is configured to receive an external audio signal. The received audio signal may be further stored in the memory 802 or may be sent via the communication component 808. In some embodiments, the audio component 805 further includes a loudspeaker configured to output the audio signal.

The I/O interface 806 provides an interface between the processing component 801 and a peripheral interface module. The peripheral interface module may be a keypad, a click wheel, a button or the like. These buttons may include but are not limited to: a homepage button, a volume button, a start button, and a lock button.

The sensor component 807 includes one or more sensors for assessing various states of the terminal 800. For example, the sensor component 807 may detect an on/off state of the terminal 800 and relative positioning of components such as the display and the keypad of the terminal 800. The sensor component 807 may further detect a change in the location of the terminal 800 or of a component of the terminal 800, whether there is contact between the terminal 800 and a user, the orientation or acceleration/deceleration of the terminal 800, and a change in the temperature of the terminal 800. The sensor component 807 may include a proximity sensor configured to detect existence of a nearby object without physical contact. The sensor component 807 may further include an optical sensor such as a Complementary Metal-Oxide-Semiconductor (CMOS) or Charge-Coupled-Device (CCD) image sensor used in an imaging application. In some embodiments, the sensor component 807 may further include an acceleration sensor, a gyroscope sensor, a magnetic sensor, a pressure sensor, or a temperature sensor.

The communication component 808 is configured to facilitate wired or wireless/radio communication between the terminal 800 and other equipment. The terminal 800 may access a radio network based on a communication standard such as WiFi, 2G, 3G, . . . , or a combination thereof. In an illustrative embodiment, the communication component 808 broadcasts related information or receives a broadcast signal from an external broadcast management system via a broadcast channel. In an illustrative embodiment, the communication component 808 further includes a Near Field Communication (NFC) module for short-range communication. For example, the NFC module may be realized based on Radio Frequency Identification (RFID), Infrared Data Association (IrDA), Ultra-WideBand (UWB) technology, BluTooth (BT) technology, and other technologies.

In an illustrative embodiment, the terminal 800 may be realized by one or more of Application Specific Integrated Circuits (ASIC), Digital Signal Processors (DSP), Digital Signal Processing Device (DSPD), Programmable Logic Devices (PLD), Field Programmable Gate Arrays (FPGA), controllers, microcontrollers, microprocessors or other electronic components, to implement the method.

In an illustrative embodiment, a transitory or non-transitory computer-readable storage medium including instructions, such as the memory 802 including instructions, is further provided. The instructions may be executed by the processor 810 of the terminal 800 to implement the method. For example, the computer-readable storage medium may be a Read-Only Memory (ROM), a Random Access Memory (RAM), a Compact Disc Read-Only Memory (CD-ROM), a magnetic tape, a floppy disk, optical data storage equipment, etc.

Embodiments of the present disclosure further provide a transitory or non-transitory computer-readable storage medium. When instructions in the storage medium are executed by a processor of a mobile terminal, the mobile terminal is allowed to perform the method provided in any one of the embodiments.

Further note that herein by "multiple", it may mean two or more. Other quantifiers may have similar meanings. A term "and/or" may describe an association between associated objects, indicating three possible relationships. For example, by A and/or B, it may mean that there may be three cases, namely, existence of but A, existence of both A and B, or existence of but B. A slash mark "/" may generally denote an "or" relationship between two associated objects that come respectively before and after the slash mark. Singulars "a/an", "said" and "the" are intended to include the plural form, unless expressly illustrated otherwise by context.

Further note that although in drawings herein operations are described in a specific or der, it should not be construed as that the operations have to be performed in the specific or der or sequence, or that any operation shown has to be performed in or der to acquire an expected result. Under a specific circumstance, multitask and parallel processing may be advantageous.

Other implementations of the present disclosure will be apparent to a person having ordinary skill in the art that has considered the specification and practiced the present disclosure. The present disclosure is intended to cover any variation, use, or adaptation of the present disclosure following the general principles of the present disclosure and including such departures from the present disclosure as come within common knowledge or customary practice in the art. The specification and the embodiments are intended to be illustrative only, with a true scope and spirit of the present disclosure being indicated by the appended claims.

It should be understood that the present disclosure is not limited to the exact construction that has been described above and illustrated in the accompanying drawings, and that various modifications and changes can be made to the present disclosure without departing from the scope of the present disclosure. It is intended that the scope of the present disclosure is limited only by the appended claims.

According to a first aspect of embodiments of the present disclosure, there is provided a method for processing a video. The method is applied to a terminal, and includes:

determining a subject region of a video frame in a video, in which a target object is located, and a background region, the background region being a region of the video frame other than the subject region; and overlaying the subject region in at least one of a first video frame having the target object on at least one of a second video frame having the target object, generating a special effect frame including at least two subject regions in each of which the target object is located.

In some embodiments, determining the subject region of the video frame in the video in which the target object is located and the background region other than the subject region includes:

identifying the target object in the video frame in the video; and determining the subject region and the background region according to the target object.

In some embodiments, the first video frame includes a freeze-frame. The second video frame may include a video frame after the freeze-frame.

Overlaying the subject region in the at least one of the first video frame having the target object on the at least one of the second video frame having the target object, generating the special effect frame including the at least two subject regions in each of which the target object is located, may include:

selecting at least one of the freeze-frame from the video frame of the video; and overlaying the subject region of the freeze-frame on the second video frame, generating the special effect frame.

In some embodiments, selecting the at least one of the freeze-frame from the video frame of the video includes:

detecting a predetermined operation instruction during playback of the video; and determining, as the freeze-frame, a video frame displayed when the predetermined operation instruction is detected.

In some embodiments, selecting the at least one of the freeze-frame from the video frame of the video includes:

selecting, as the freeze-frame, video frames at intervals of a predetermined duration in the video.

In some embodiments, selecting the at least one of the freeze-frame from the video frame of the video includes:

determining a stance of the target object in the video frame of the video; and in response to stances of the target object in a consecutive number N of the video frame being identical, selecting one of the consecutive number N of the video frame as the freeze-frame. The N may be a positive integer greater than or equal to 2.

In some embodiments, selecting the at least one of the freeze-frame from the video frame of the video includes:

determining a location of the target object in a current video frame; and in response to a distance between the location of the target object in the current video frame and a location of the target object in a last freeze-frame being a predetermined distance, determining the current video frame as the freeze-frame.

In some embodiments, the method further includes:

determining an alignment parameter of the subject region of the first video frame according to a location of the target object in the first video frame. The alignment parameter may be used to determine a target location of the subject region of the first video frame in the special effect frame.

The subject region in at least one video frame may be overlaid on at least one video frame other than the video frame where the target object is located, generating the special effect frame including at least two subject regions where the target object is located, as follows.

The subject region may be overlaid, according to the alignment parameter, at the target location on at least one video frame other than the video frame in which the target object is located, generating the special effect frame including two subject regions in each of which the target object is located.

In some embodiments, determining the alignment parameter of the subject region of the first video frame according to the location of the target object in the first video frame includes:

selecting, from the video frame of the video, a video frame as a reference frame; and determining the alignment parameter according to a location offset of the target object in the first video frame with respect to the target object in the reference frame.

In some embodiments, the second video frame includes a video frame before the freeze-frame.

Overlaying the subject region in the at least one of the first video frame having the target object on the at least one of the second video frame having the target object, generating the special effect frame including the at least two subject regions in each of which the target object is located, may include:

overlaying the subject region in the at least one of the first video frame having the target object on at least one of a second video frame before the first video frame, generating the special effect frame.

According to a second aspect of embodiments of the present disclosure, a device for processing a video is provided. The device is applied to a terminal, and includes:

a first determining module configured to determine a subject region of a video frame in a video, in which a target object is located, and a background region, the background region being a region of the video frame other than the subject region; and a generating module configured to overlay the subject region in at least one of a first video frame having the target object on at least one of a second video frame having the target object, generating a special effect frame including at least two subject regions in each of which the target object is located.

In some embodiments, the first determining module includes:

an identifying sub-module configured to identify the target object in the video frame in the video; and a first determining sub-module configured to determine the subject region and the background region according to the target object.

In some embodiments, the first video frame includes a freeze-frame. The second video frame may include a video frame after the freeze-frame.

The generating module may include:

a first selecting sub-module configured to select at least one of the freeze-frame from the video frame of the video; and a generating sub-module configured to overlay the subject region of the freeze-frame on the second video frame, generating the special effect frame.

In some embodiments, the first selecting sub-module includes:

a detecting sub-module configured to detect a predetermined operation instruction during playback of the video; and a second determining sub-module configured to determine, as the freeze-frame, a video frame displayed when the predetermined operation instruction is detected.

In some embodiments, the first selecting sub-module is specifically configured to:

select, as the freeze-frame, video frames at intervals of a predetermined duration in the video.

In some embodiments, the first selecting sub-module includes:

a third determining sub-module configured to determine a stance of the target object in the video frame of the video; and a second selecting sub-module configured to, in response to stances of the target object in a consecutive number N of the video frame being identical, select one of the consecutive number N of the video frame as the freeze-frame. The N may be a positive integer greater than or equal to 2.

In some embodiments, the first selecting sub-module includes:

a fourth determining sub-module configured to determine a location of the target object in a current video frame; and a fifth determining sub-module configured to, in response to a distance between the location of the target object in the current video frame and a location of the target object in a last freeze-frame being a predetermined distance, determine the current video frame as the freeze-frame.

In some embodiments, the device further includes:

a second determining module configured to determine an alignment parameter of the subject region of the first video frame according to a location of the target object in the first video frame. The alignment parameter may be used to determine a target location of the subject region of the first video frame in the special effect frame.

The generating module may be specifically configured to:
according to the alignment parameter, overlay the subject region of the first video frame at the target location on at least one video frame other than the first video frame in which the target object is located, generating the special effect frame including two subject regions in each of which the target object is located.

In some embodiments, the second determining module includes:

a third selecting sub-module configured to select, from the video frame of the video, a video frame as a reference frame; and a sixth determining sub-module configured to determine the alignment parameter according to a location offset of the target object in the first video frame with respect to the target object in the reference frame.

In some embodiments, the second video frame includes a video frame before the freeze-frame. The generating module may be specifically configured to:

overlay the subject region in the at least one of the first video frame having the target object on at least one of a second video frame before the first video frame, generating the special effect frame.

According to a third aspect of embodiments of the present disclosure, a communication device of a terminal is provided. The device includes at least a processor and a memory for storing executable instructions executable on the processor.

The processor is configured to execute the executable instructions to perform a step of any method for processing a video herein.

According to a fourth aspect of embodiments of the present disclosure, a non-transitory computer-readable storage medium is provided. The computer-readable storage medium has stored therein computer-executable instructions which, when executed by a processor, implement a step of any method for processing a video herein.

What is claimed is:

1. A method for processing a video, the method applied to a terminal, and comprising:
    determining a subject region and a background region of a video frame in a video, wherein a target object is located in the subject region, and wherein the background region is a region of the video frame other than the subject region; and
    overlaying the subject region in at least one of a first video frame having the target object on at least one of a second video frame having the target object, and generating a special effect frame that comprises at least two subject regions in each of which the target object is located,
    wherein overlaying the subject region in the at least one of the first video frame having the target object on the at least one of the second video frame having the target object, and generating the special effect frame that comprises the at least two subject regions in each of which the target object is located, comprises:
    determining an alignment parameter of the subject region of the first video frame according to a location of the target object in the first video frame, wherein the alignment parameter is used to determine a target location of the subject region of the first video frame in the special effect frame, and
    overlaying, according to the alignment parameter, the subject region of the first video frame at the target location on at least one video frame other than the first video frame in which the target object is located, and generating the special effect frame that comprises two subject regions in each of which the target object is located.

2. The method of claim 1, wherein determining the subject region and the background region of the video frame in the video comprises:
    identifying the target object in the video frame in the video; and
    determining the subject region and the background region according to the target object.

3. The method of claim 1, wherein overlaying the subject region in the at least one of the first video frame having the target object on the at least one of the second video frame having the target object, and generating the special effect frame further comprises:
    selecting at least one of a freeze-frame from a video frame of the video, wherein the first video frame comprises the freeze-frame, and wherein the second video frame comprises the video frame after the freeze-frame; and
    overlaying the subject region of the freeze-frame on the second video frame, and generating the special effect frame.

4. The method of claim 3, wherein selecting the at least one of the freeze-frame from the video frame of the video comprises:
    detecting a predetermined operation instruction during playback of the video; and
    determining, as the freeze-frame, a video frame displayed when the predetermined operation instruction is detected.

5. The method of claim 3, wherein selecting the at least one of the freeze-frame from the video frame of the video comprises:
    selecting, as the freeze-frame, video frames at intervals of a predetermined duration in the video.

6. The method of claim 3, wherein selecting the at least one of the freeze-frame from the video frame of the video comprises:
    determining a stance of the target object in the video frame of the video; and
    selecting, in response to stances of the target object in a consecutive number N of the video frame being identical, one of the consecutive number N of the video frame as the freeze-frame, wherein the N is a positive integer greater than or equal to 2.

7. The method of claim 3, wherein selecting the at least one of the freeze-frame from the video frame of the video comprises:
determining a location of the target object in a current video frame; and
determining, in response to a distance between the location of the target object in the current video frame and a location of the target object in a last freeze-frame being a predetermined distance, the current video frame as the freeze-frame.

8. The method of claim 1, wherein determining the alignment parameter of the subject region of the first video frame according to the location of the target object in the first video frame comprises:
selecting, from the video frame of the video, a video frame as a reference frame; and
determining the alignment parameter according to a location offset of the target object in the first video frame with respect to the target object in the reference frame.

9. The method of claim 1, wherein overlaying the subject region in the at least one of the first video frame having the target object on the at least one of the second video frame having the target object, and generating the special effect frame further comprises:
overlaying the subject region in the at least one of the first video frame having the overlaying the subject region in the at least one of the first video frame having the target object on at least one of a second video frame before the first video frame, and generating the special effect frame.

10. A device, comprising:
one or more processors and a non-transitory computer-readable storage medium for storing executable instructions executable on the one or more processors, wherein the one or more processors are configured to:
determine a subject region of a video frame in a video and a background region, wherein a target object is located in the subject region, and wherein the background region is a region of the video frame other than the subject region; and
overlay the subject region in at least one of a first video frame having the target object on at least one of a second video frame having the target object, and generating a special effect frame that comprises at least two subject regions in each of which the target object is located,
wherein the one or more processors are further configured to:
determine an alignment parameter of the subject region of the first video frame according to a location of the target object in the first video frame, wherein the alignment parameter is used to determine a target location of the subject region of the first video frame in the special effect frame, and
overlay, according to the alignment parameter, the subject region of the first video frame at the target location on at least one video frame other than the first video frame in which the target object is located, and generate the special effect frame that comprises two subject regions in each of which the target object is located.

11. The device of claim 10, wherein the processor is configured to implement: determining the subject region and the background region of the video frame in the video, by:
identify the target object in the video frame in the video; and
determine the subject region and the background region according to the target object.

12. The device of claim 10, wherein the one or more processors configured to overlay the subject region in the at least one of the first video frame having the target object on the at least one of the second video frame having the target object, and generate the special effect frame are further configured to:
select at least one of a freeze-frame from a video frame of the video, wherein the first video frame comprises the freeze-frame, and wherein the second video frame comprising the video frame after the freeze-frame; and
overlay the subject region of the freeze-frame on the second video frame, and generate the special effect frame.

13. The device of claim 12, wherein the one or more processors configured to select the at least one of the freeze-frame from the video frame of the video, are further configured to:
detect a predetermined operation instruction during playback of the video; and
determine, as the freeze-frame, a video frame displayed when the predetermined operation instruction is detected.

14. The device of claim 12, wherein the one or more processors configured to select the at least one of the freeze-frame from the video frame of the video are further configured to:
select, as the freeze-frame, video frames at intervals of a predetermined duration in the video.

15. The device of claim 12, wherein the one or more processors configured to select the at least one of the freeze-frame from the video frame of the video are further configured to:
determine a stance of the target object in the video frame of the video; and
select, in response to stances of the target object in a consecutive number N of the video frame being identical, one of the consecutive number N of the video frame as the freeze-frame, wherein the N is a positive integer greater than or equal to 2.

16. The device of claim 12, wherein the one or more processors configured to select the at least one of the freeze-frame from the video frame of the video are further configured to:
determine a location of the target object in a current video frame; and
determine, in response to a distance between the location of the target object in the current video frame and a location of the target object in a last freeze-frame being a predetermined distance, the current video frame as the freeze-frame.

17. The device of claim 10, wherein the one or more processors are configured to overlay the subject region in the at least one of the first video frame having the target object on the at least one of the second video frame having the target object, and generate the special effect frame that comprises the at least two subject regions in each of which the target object is located are further configured to:
overlay the subject region in the at least one of the first video frame having the overlay the subject region in the at least one of the first video frame having the target object on at least one of a second video frame before the first video frame, and generate the special effect frame.

18. A non-transitory computer-readable storage medium having stored therein computer-executable instructions for execution by a computing device having one or more processors, wherein the computer-executable instructions, when executed by a computing device having one or more processors, cause the computing device to perform acts comprising:

determining a subject region of a video frame in a video and a background region, wherein a target object is located in the subject region, and wherein the background region is a region of the video frame other than the subject region; and overlaying the subject region in at least one of a first video frame having the target object on at least one of a second video frame having the target object, and generating a special effect frame that comprises at least two subject regions in each of which the target object is located, wherein overlaying the subject region in the at least one of the first video frame having the target object on the at least one of the second video frame having the target object, and generating the special effect frame that comprises the at least two subject regions in each of which the target object is located, comprises:

determining an alignment parameter of the subject region of the first video frame according to a location of the target object in the first video frame, wherein the alignment parameter is used to determine a target location of the subject region of the first video frame in the special effect frame, and overlaying, according to the alignment parameter, the subject region of the first video frame at the target location on at least one video frame other than the first video frame in which the target object is located, and generating the special effect frame that comprises two subject regions in each of which the target object is located.

* * * * *